Oct. 25, 1955  E. C. THOMSON  2,721,978

PEAK-READING VOLTMETERS

Filed Dec. 8, 1954

INVENTOR
E. C. THOMSON
BY Jean C. Chognard
ATTORNEY

United States Patent Office 2,721,978
Patented Oct. 25, 1955

2,721,978

PEAK-READING VOLTMETERS

Elihu Craig Thomson, Wellesley, Mass., assignor to Electronics Corporation of America, Cambridge, Mass., a corporation of Massachusetts Application December 8, 1954, Serial No. 473,821

3 Claims. (Cl. 324—103)

This invention relates to peak-reading voltmeters, and more particularly to peak-reading voltmeters having unusually long signal-storage characteristics.

There are instances where it is desirable to have peak-reading voltmeters which are capable of storing a signal for a considerable period of time. One such instance occurs in the measurement of energy from a flash of light. Several photometers may be positioned at various locations remote from the flash, and these photometers may have to be left unattended for several hours after the occurrence of the flash.

It is therefore an object of this invention to provide a simple peak-reading voltmeter which is capable of storing information on a capacitor for a considerable length of time, and which has means for reading the stored information without discharging the capacitor on which the information is stored.

In accordance with the illustrated embodiment of the present invention, the signal to be measured is applied through a storage capacitor between the cathode and a control grid of an electron tube so that the signal causes grid current to flow. This eventually causes the capacitor to charge so as to apply a negative biasing potential to the control grid of the tube, the charge on the capacitor being a function of the peak of the applied signal. In order to measure this charge, a calibrated voltage source is used to apply a gradually increasing voltage across the capacitor which bucks the charge stored thereon. A current-sensitive device such as a galvanometer is used to indicate when anode current is beginning to flow in the tube. The voltage from the calibrated source at which this condition is established is an indication of the peak of the applied signal.

Figure 1:
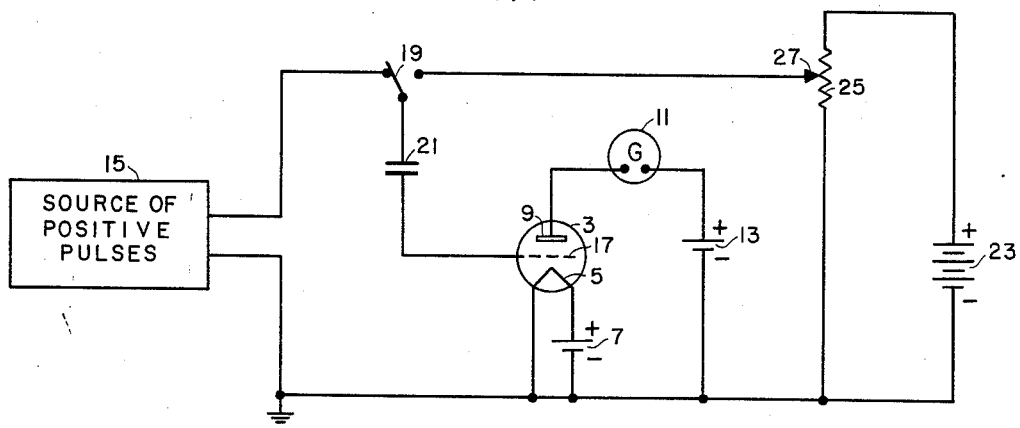
Figure 2:
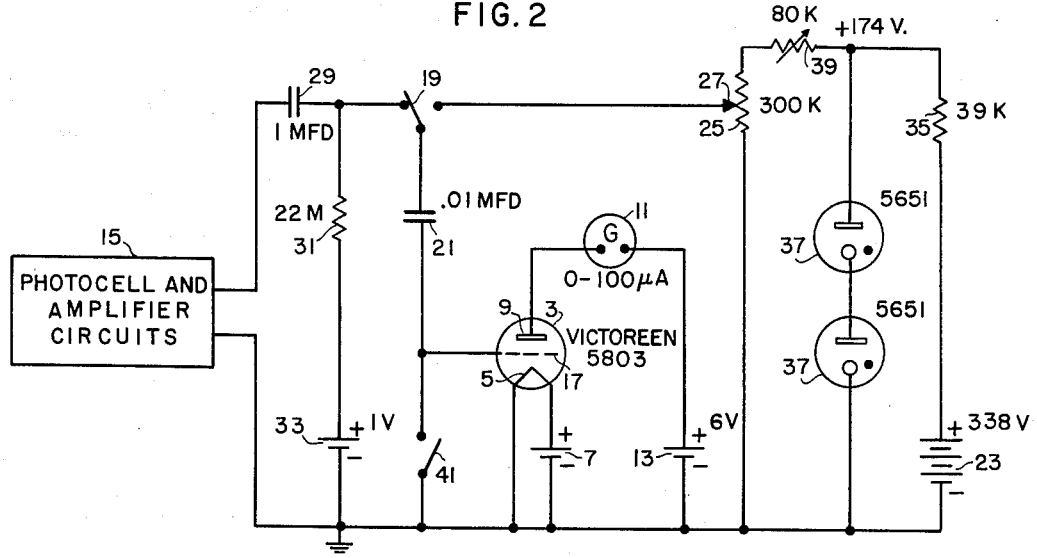

Other and incidental objects of the present invention will be apparent to those skilled in the art from a reading of the following specification and an inspection of the accompanying drawings in which:

Figure 1 is a simplified schematic diagram of a peak-reading voltmeter in accordance with the present invention and which is designed to measure the peak voltage of a signal with respect to ground; and Figure 2 is a schematic diagram of a peak-reading voltmeter in accordance with the present invention and which may be used, for instance, to measure the peak of a flash above the D. C. level caused by ambient light.

Referring to Figure 1, the peak-reading voltmeter shown comprises an electron tube such as triode 3. Triode 3 is a tube such as Victoreen 5803 in which special techniques have been used to reduce the grid current to a minimum when the tube is normally operated as a triode, i. e. with its grid negative with respect to its cathode. The cathode or filament 5 of triode 3 is heated by a battery 7 one side of which is grounded. The anode 9 of triode 3 is connected to ground through a current-sensitive device such as galvanometer 11 and a battery 13 which renders anode 9 positive by a few volts with respect to cathode 5.

The signal to be measured is shown as coming from a source of positive pulses 15 and is applied between the control grid 17 and the cathode 5 of tube 3 through a switch 19 and a storage capacitor 21. Capacitor 21 is a specially constructed capacitor which uses a polystyrene dielectric. This material makes possible capacitors having a very high internal resistance and therefore a very low leakage curent. The capacitor shown may have a value of .01 microfarad and an internal resistance of $10^{14}$ ohms. The loss of the charge on capacitor 21 through internal leakage is of the order of .5 per cent per hour and may be ignored for practical purposes. A calibrated source of unidirectional potential comprising battery 23 and potentiometer 25 is also provided. The switch 19 may be used to disconnect the capacitor 21 from the source of positive pulses 15 and to connect it to the sliding contact 27 of potentiometer 25.

The operation of the peak-reading voltmeter of Figure 1 is as follows:

Before positive pulses from source 15 are applied to the triode 3, there may be some anode current in the triode 3. However, whether or not there is such current is immaterial to the operation of the circuit. When a positive pulse is applied to the control grid 17 of tube 3, this pulse causes electrons to flow from the cathode 5 to the control grid 17 of tube 3. This electron flow causes the storage capacitor 21 to charge to the peak value of the pulse by grid-cathode rectification. After the occurrence of the pulse, the capacitor 21 retains this charge, and the polarity of this charge is such that the grid end of the capacitor is negative. There is therefore no anode current flow in triode 3.

The circuit provides means for determining what the voltage across capacitor 21 is, hence what the peak-positive signal was at some time in the past. This is done by switching over the positive end of capacitor 21 by means of switch 19 to the potentiometer 25 across which a positive voltage is established. Starting with the sliding contact 27 at ground potential, the potentiometer voltage is increased gradually until the galvanometer 11 shows some flow of anode current in triode 3. Since the potentiometer 25 may be calibrated, it now indicates the voltage on the capacitor less the grid-to-cathode voltage of the triode 3 required to give the particular reading shown on the galvanometer 11. However, this grid-to-cathode voltage is a fixed quantity, and the potentiometer 25 may be calibrated accordingly. Thus the voltage across the capacitor 21 may be measured without discharging the capacitor. There is no connection to the negative terminal of the capacitor, hence there is no possibility of discharging the capacitor between the reception of the signal and the reading out of the voltage.

The circuit of Figure 2 includes an additional RC network comprising capacitor 29 and resistor 31. This RC network has a time constant which is many times longer than the duration of the pulses in the signal to be measured, and establishes a D. C. level such as that due to ambient light. The circuit of Figure 2 includes a source of biasing potential for triode 3 which source is shown as a battery 33. The calibrated source of variable unidirectional voltage is a regulated power supply comprising battery 33, grid-limiting resistor 35, and gaseous regulator tubes 37. A calibrating resistor 39 is connected in series with the potentiometer 25. A switch 41 is provided between the control grid 17 of tube 3 and ground and provides means to discharge the capacitor 21 after the voltage across it has been measured.

The operation of the circuit of Figure 2 is as follows:

Here the source of positive pulses is a photocell and associated amplifier circuits 15. It is desired to measure the peak of a flash above the D. C. level caused by ambient light. When the switch 19 is in the position shown, any positive-going signal will cause grid current to flow in the triode 3, since the grid-cathode circuit of triode 3 will act as a rectifier. Capacitor 21 will then charge to the peak value of the signal except for 1 per cent of the signal which will appear across capacitor 29 because of the ratio of their respective capacitances. After the signal has passed, capacitor 29 discharges through resistor 31. The charge on capacitor 21, however, is retained, as the grid 17 of tube 3 is negative. The maximum positive signal may be as high as 150 volts, and when initial conditions are again restored, the grid 17 of tube 3 is 150 volts negative. Ordinarily such a voltage would be excessively high, but it is permissible here since we have a special type of triode in which negative-grid current is very close to 0 (less than $10^{-14}$ amperes).

When it is desired to read out the voltage on capacitor 21, the sliding contact 27 of potentiometer 25 is set at ground potential, and the positive end of capacitor 21 is connected to the sliding contact 27 by means of switch 19. The potentiometer voltage is then raised slowly until the positive terminal of capacitor 21 approaches the value of the original signal. The grid 17 of tube 3 becomes progressively less negative until the negative voltage thereon is low enough to cause anode current to flow in triode 3. When the anode current reaches a certain value (about 50 microamperes) as indicated by the galvanometer 11, the calibrated potentiometer 25 indicates the voltage on the capacitor, and therefore the peak value of the signal from the source 15.

I claim:

1. A peak-reading voltmeter designed to measure the peak voltage of positive-going pulses and comprising: first and second input terminals, an electron tube having an anode, a cathode, and a control electrode, means to render said anode positive with respect to said cathode, a current-sensitive device to indicate current flow between said anode and said cathode, a capacitor connected between said control electrode and said first input terminal, means to apply said positive-going pulses between the cathode and the control electrode through said capacitor with such polarity that they will cause current to flow between said cathode and said control electrode whereby said capacitor will charge to a voltage proportional to the peak voltage of said pulses, a calibrated source of variable unidirectional voltage, and switching means to disconnect said capacitor from said first input terminal and to connect it to said source of variable unidirectional voltage with such polarity that the voltage from said source will oppose the voltage across said capacitor.

2. A peak-reading voltmeter according to claim 1 wherein said pulses are applied to said input terminals from across the resistance of an RC network having a time constant which is many times longer than the duration of said pulses.

3. A peak-reading voltmeter designed to measure the voltage of positive-going pulses and comprising: two input terminals, an electron tube having an anode, a cathode, and a control electrode, a current-sensitive device and a source of potential connected in series between the anode and the cathode of said tube, a connection between the cathode of said electron tube and one of said input terminals, a variable voltage source, a capacitor having two terminals, means connecting one terminal of said capacitor to the control electrode of said electron tube, and switching means to connect the other terminal of said capacitor selectively to the other of said input terminals and to said variable voltage source.

References Cited in the file of this patent

FOREIGN PATENTS 461,494    Great Britain _____ Feb. 15, 1937

OTHER REFERENCES

"Electronic," vol. 23, Issue 5, pages 110, 111; pub. date May 1950. Copy in Div. 69.